United States Patent [19]

Breese

[11] Patent Number: 4,869,535

[45] Date of Patent: Sep. 26, 1989

[54] SUBMERGED ACTUATOR

[75] Inventor: Peter Breese, Houston, Tex.

[73] Assignee: Cameron Iron Works USA, Inc., Houston, Tex.

[21] Appl. No.: 193,068

[22] Filed: May 12, 1988

[30] Foreign Application Priority Data

Apr. 22, 1988 [EP] European Pat. Off. ........ 88303674.1

[51] Int. Cl.[4] ........................................ F16L 35/00

[52] U.S. Cl. ........................................ 285/39; 285/315; 285/910

[58] Field of Search ............... 285/315, 920, 141, 321, 285/322, 910, 18, 39

[56] References Cited

U.S. PATENT DOCUMENTS

| | | | |
|---|---|---|---|
| 3,393,926 | 7/1968 | Arnold | 285/322 X |
| 3,510,153 | 5/1970 | Newton | 285/315 X |
| 4,049,297 | 9/1977 | Reneau | 285/315 X |
| 4,453,745 | 6/1984 | Nelson | 285/321 X |
| 4,662,663 | 5/1987 | Schmitz | 285/910 |

*Primary Examiner*—Dave W. Arola

[57] ABSTRACT

A well structure which includes a well housing having an upwardly facing internal shoulder and an internal recess below the shoulder, a tieback adapted to be landed on said housing internal shoulder and having an upper internal surface and a smaller lower internal surface with a shoulder therebetween, an actuator sleeve having an upper outer portion fitting closely within the upper internal surface of the tieback, a lower outer portion fitting closely with the lower internal surface of said tieback, a downwardly facing external shoulder between said lower and upper outer portions and a lower tapered surface tapering downwardly and inwardly, latch elements having upper and outer tapered surfaces mating with the lower tapered surface on said actuator sleeve, and a pressure compensating material position in the annulus between said shoulders and the upper internal surface of said tieback and the lower outer portion of said actuator sleeve so that downward movement of said actuator sleeve within said tieback is not prevented by the trapping of liquid within said annulus.

6 Claims, 2 Drawing Sheets

SUBMERGED ACTUATOR

BACKGROUND

In petroleum wells, sliding piston sleeve actuators are often used for many purposes. In such wells it is important that pockets, created in the annular spaces between the sleeves and the tubular members with which they coact, not be filled with liquid which would result in a hydraulic lock preventing proper operation of the moving sleeve. The present invention relates to an improved sleeve actuator in which the cavity between the sleeve and the tubular member with which it coacts excludes the well liquids from entry therein so that hydraulic lock does not prevent proper operation.

U.S. Pat. No. 4,662,663 discloses a method and apparatus for the forming of one tubular member of a subsea pipeline into another tubular member having internal lands and grooves for receiving the formed member and provides for the filling of the grooves with a structure which compensates for the pressure which tends to build during the forming step. This patent suggests the use of a gas filled tube or the use of a material which is composed of a plurality of microspheres in an epoxy matrix. This material is described in such patent as being suitable to exclude sufficient liquid (sea water) from the grooves so that when the inner tubular member is formed therein that the material collapses to prevent any pressure build-up in the grooves which would interfere with the proper completion of the forming step.

SUMMARY

The improved structure of the present invention includes a tubular member, such as a housing, a tieback landed on the housing, a sleeve slidable axially with respect to the tubular member and the tieback and an annular space between the sleeve and the tieback which decreases in volume with axial movement of the sleeve in one direction and increases in volume with the axial movement of the sleeve in the other direction. The movement of the sleeve functions as an actuator to cause the movement of a latch elements carried by the tieback to latch into an interior recess in the tubular member. A substantial portion of the annular space is filled with a pressure compensating material which collapses during the movement of the sleeve which decreases the volume of the annular space.

An object of the present invention is to provide an improved actuator for coaction with a tubular member and a movable element which is not prevented from proper actuation by the influx of liquids into the space between the actuator and the tubular member.

A further object is to provide an improved actuator sleeve for use in a well housing which can be actuated axially with respect to the well housing to wedge a latching ring or latching elements into engagement within a groove in the housing and which is pressure compensated so that well fluids do not interfere with the proper actuation of the latching ring or elements.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
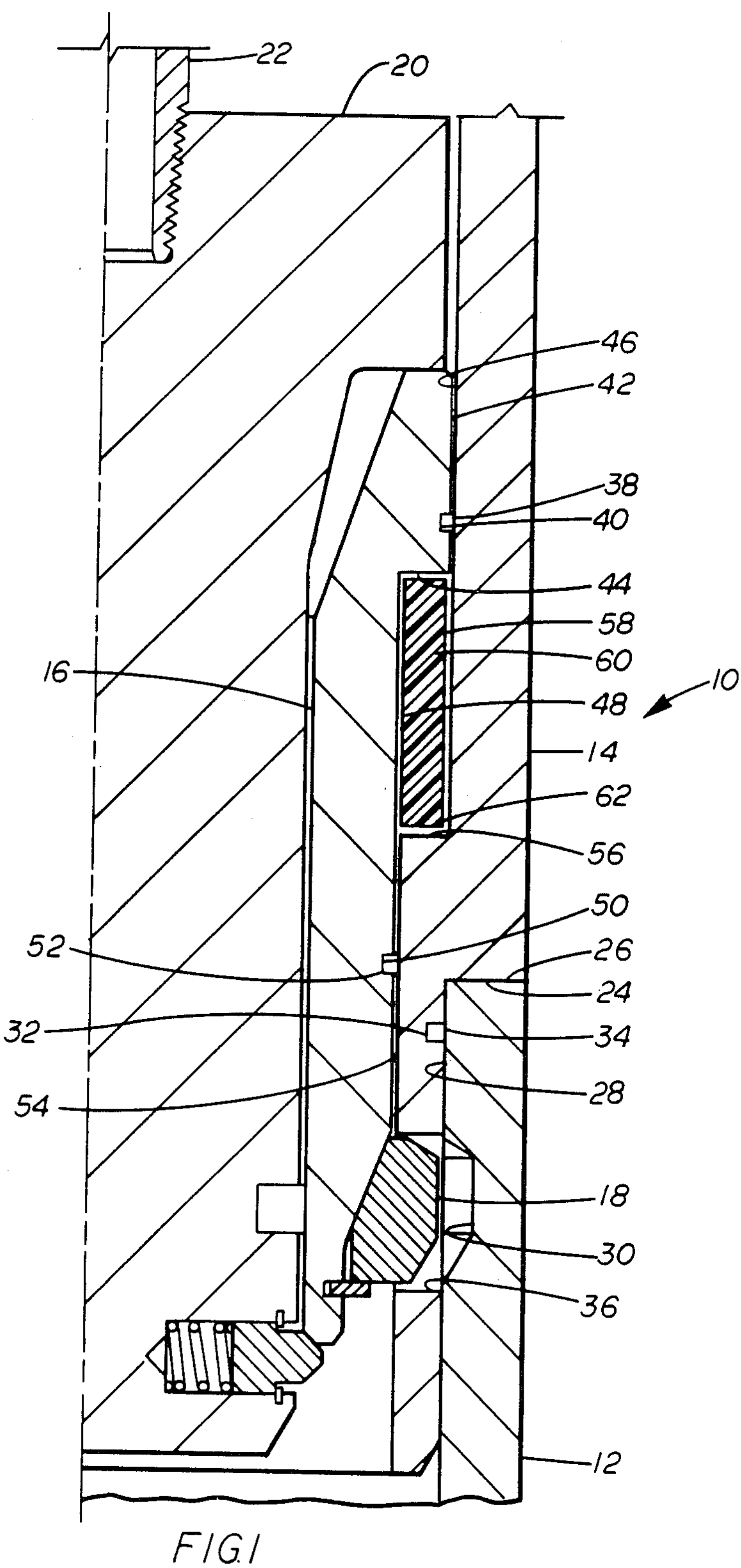
FIG. 1 is a partial sectional view of an actuator sleeve within a well housing having a tieback landed therein wherein the sleeve is moved axially responsive to pressure and actuates the latch elements to secure the tieback to the housing.

Well structure 10 illustrated in the drawings includes first tubular member or housing 12, second tubular member or tieback 14, and sleeve actuator 16 positioned therein to actuate the locking element, such as latch elements or dogs 18 supported in windows in the lower end of tieback 14 as shown. Sleeve actuator 16 is shown supported on running tool 20 with tieback 14 carried thereby. The assembly is lowered within housing on running string 22. Tieback 14 landed on the upper end of housing 12 and its windows carrying latch elements 18 are positioned within the interior of housing 12 as shown in FIG. 1. Downwardly facing external shoulder 24 on tieback 14 seats on upwardly facing shoulder 26 of housing 12. Internal surface 28 of housing 12 includes latching recess 30 which is positioned to receive latch elements 18. Seal 32 is positioned within groove 34 oh the exterior of tieback 14 below shoulder 24 and, as shown in the figures, seals against the internal surface 28 of housing 12 when tieback 14 is properly positioned therein. Windows 36 extend through the lower end of tieback 14.

Sleeve actuator 16 and tieback 14 are lowered within housing 12 to the position shown in FIG. 1 on running tool 20 which is supported on running string 22. Sleeve actuator 16 is sized to be positioned within tieback 14 and housing 12 as shown with seal 38 positioned within groove 40 on the exterior upper surface 42 above downwardly facing shoulder 44. Seal 38 engages inner surface 46 of tieback 14. Surface 48 on the exterior of sleeve actuator 16 below shoulder 44 includes groove 50 in which seal ring 52 is positioned for sealing against tieback inner surface 54 below tieback shoulder 56 which faces upwardly. Volume compensating material ring 58 is positioned in surrounding relationship to sleeve 16 below shoulder 44. Material of ring 58 is provided to have an outer diameter either the same or slightly smaller than the diameter of surface 42 so that it will readily enter within surface 46 of tieback 14. Any suitable volume compensating material 60 may be used for ring 58 provided it excludes liquids from the annular space 62 between shoulders 44 and 56 and between surfaces 46 and 48 and has the ability to collapse under actuating pressure to allow full movement of actuator sleeve 16 to set latch elements into housing recess 30. A suitable material is microspheres embedded in an epoxy matrix. The function of the pressure compensating material is to exclude the liquids from the annular space 62 without collapsing but to collapse when force above the local environment is applied to create the movement of actuator sleeve 16. Material 60 thus prevents the creation of a hydraulic lock without itself creating any appreciable resistance to the actuation of sleeve actuator 16.

Latch elements 18 are carried in windows 36 in the lower end of tieback with cam surface 64 on the exterior of sleeve 16 mating with upper inner cam surfaces 66 on elements 18. Split ring 68 engages in groove 70 in the lower portion of sleeve 16 to support latch elements 18 in position for actuation.

Sleeve 16 is supported on the exterior of running tool 20 by a plurality of spring loaded retaining pins 72 which are positioned within recesses in the lower exterior of tool 20. The outer ends of pins 72 have a frustoconical shape which mates with the inner tapered surface 74 on the lower end of sleeve 16. Sleeve 16 is positioned around the exterior of tool 20 between pins 72 and upper running tool flange 76. Seal ring 78 is positioned within groove 80 around the exterior of the lower portion to running tool 20 and seals against interior surface 82 of sleeve 16.

Figure 2:
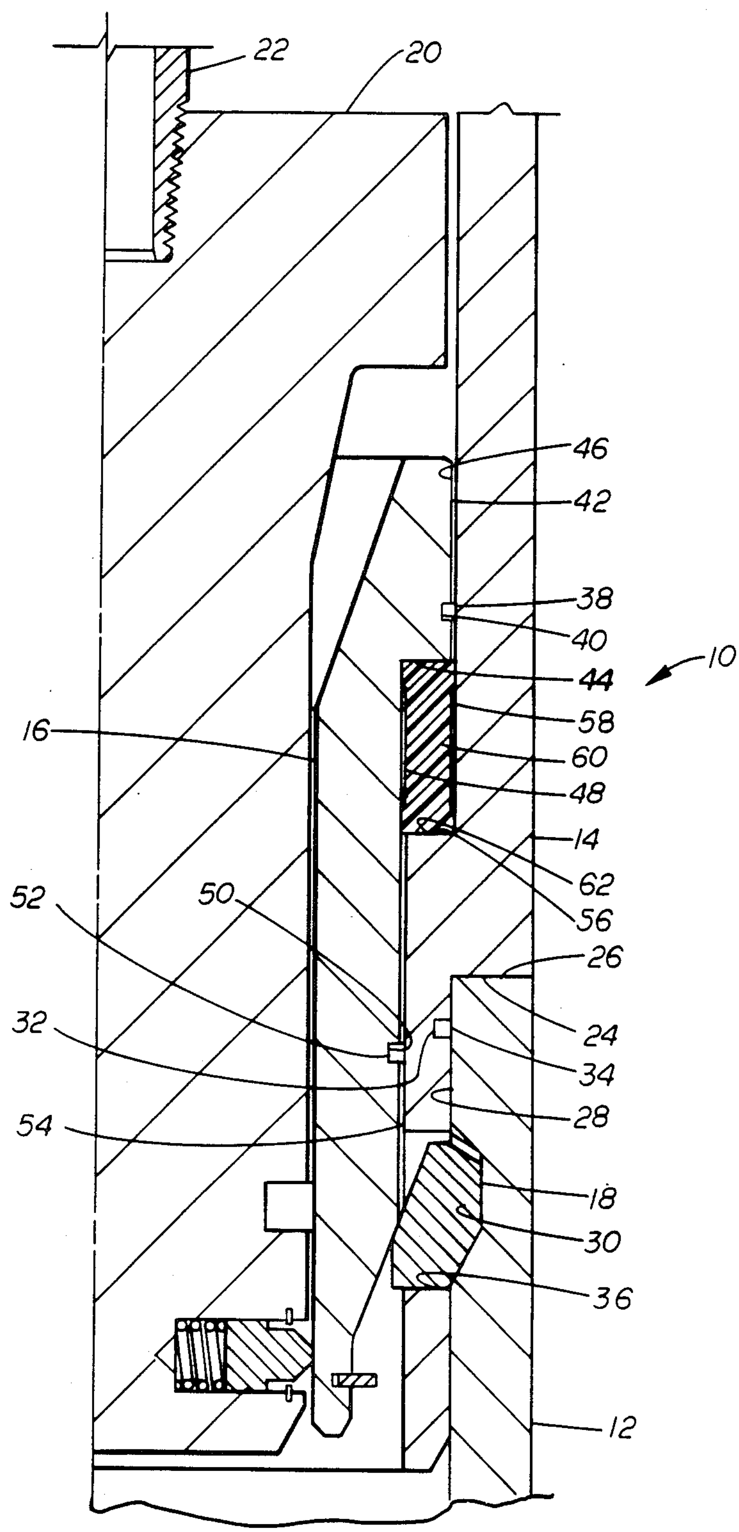
FIG. 2 is similar to FIG. 1 and shows the actuator in its set position to illustrate the collapse of the pressure compensating material.

With sleeve 16 positioned as shown in FIG. 1, it is in position to be actuated to force latch elements 18 into engagement with the interior recess 30 of housing 12. Pressure is applied around the exterior of running string 22 above running tool 20. This pressure is sufficient to cause sleeve to be moved downwardly into the position shown in FIG. 2. Sleeve 16 is subjected to a pressure differential because of seal rings 78 and 38. The downward movement of sleeve 16 causes volume compensating material ring 58 to collapse as the annular space in which it is positioned is reduced in volume by this downward movement of sleeve 16. Latch elements 18 engage the lower portion of their windows 36 in tieback 14 and the mating cam surfaces 64 and 66 on sleeve 16 an latch elements 18 coact to cause latch elements 18 to move outwardly into latching engagement within recess 30. The downward movement of sleeve 16 also causes pins 72 to be cammed inwardly into their recesses so that tool 20 may be retrieved from within sleeve 16 upon completion of the setting of latch elements 18.

What is claimed is:

1. A well structure for use in applications with liquids in the environment comprising a first member having a cylindrical surface terminating in a shoulder, an actuator body movable axially with respect to said first member and having a cylindrical surface facing and spaced from the first member cylindrical surface and a shoulder at the end of the actuator body cylindrical surface which faces said first member cylindrical surface and an annular space between said cylindrical surfaces and said shoulders which increases and decreases in volume with relative movement of said first member and said actuator body, and a collapsible pressure compensating material substantially filling the volume of said annular space at its maximum point thereby excluding liquids from said annular space and upon said relative move of said first member and said actuator body shoulders toward each other collapsing thereby decreasing in volume as said annular space decreases in volume.

2. A well structure according to claim 1 wherein said pressure compensating material is a plurality of microspheres in an epoxy matrix.

3. A well structure comprising a tubular well housing having an internal latching recess with an upwardly facing shoulder above said recess, a tieback adapted to be landed on said housing shoulder and having an upper internal surface, a lower internal surface of smaller diameter than said upper internal surface and an upwardly facing internal shoulder between said upper and lower surfaces, an actuator sleeve having an upper outer portion fitting closely within the interior of said tieback upper internal surface, a lower outer portion having a smaller diameter than said upper outer portion and fitting closely within the interior of said tieback lower internal surface and a shoulder between said upper and lower portions facing said tieback shoulder, latch elements having an integral upper surface tapering downwardly and inwardly and carried by said tieback, a tapered surface on the lower outer portion of said actuator sleeve mating with the tapered surface on said latch elements so that movement of the actuator sleeve downwardly within said well housing wedges said latch elements into said housing internal recess to secure said tieback within said housing, and a collapsible pressure compensating material positioned in and filling the annular space defined by the upper interior surface of said tieback above said tieback shoulder and the exterior of said lower sleeve actuator portion below said outer sleeve shoulder when said actuator sleeve shoulder is positioned at the maximum distance from said tieback shoulder thereby excluding liquids from said annular space and upon said downward movement of said actuator sleeve collapsing thereby decreasing in volume as said annular space decreases in volume

4. A well structure according to claim 3 including means for supporting said latch elements and said tieback on said actuator sleeve exterior below said lower tapered surface during running into the well housing.

5. A well structure according to claim 3 including means for sealing between the upper outer surface of said actuating sleeve and the upper internal surface of said tieback, and means for sealing between the lower outer surface of said actuating sleeve above said lower tapered surface and the lower internal surface of said tieback whereby pressure exerted above said actuator sleeve exerts a downward force on said actuator sleeve to move it downwardly within said tieback moving said latch elements into latching engagement within said recess.

6. A well structure according to claim 3 including a running tool for lowering said actuator sleeve, said tieback and said latch elements into said well housing, said running tool including means for supporting said actuator sleeve on its exterior and means for connecting to a running string.

* * * * *